United States Patent

[11] 3,627,345

[72] Inventor Noel Le Mire
Billancourt, France
[21] Appl. No. 882,843
[22] Filed Dec. 8, 1969
[45] Patented Dec. 14, 1971
[73] Assignees Regie Nationale Des Usines Renault
Billancourt, ;
Automobiles Peugeot
Paris, France
[32] Priority Dec. 9, 1968
[33] France
[31] 177205

[54] ENERGY ABSORPTION DEVICES FOR VEHICLES
2 Claims, 3 Drawing Figs.
[52] U.S. Cl..................................................... 280/87,
280/150 B
[51] Int. Cl........................................................ B62d 1/02
[50] Field of Search........................................... 280/150 B,
150 SB, 87; 297/388, 216; 296/65 A; 180/82.8, 82

[56] References Cited
UNITED STATES PATENTS
3,011,823 12/1961 Maher.......................... 280/150 B
3,524,678 8/1970 DeCavenne.................. 280/150 B Primary Examiner—Benjamin Hersh
Assistant Examiner—Robert R. Song
Attorney—Stevens, Davis, Miller & Mosher ABSTRACT: Energy absorption device comprising a fixed element and a movable element both connected to a frame structure and to the seat of a vehicle equipped with anchor means for safety belts or harnesses, and adapted to pivot about an axis rigid with the vehicle against the resistant force of the energy absorption device, characterized in that a member rigid with said movable element of the energy absorption device or of said seat cooperates with another energy absorption device mounted on a retractable or collapsible element in the passenger's compartment, said other energy absorption device being disposed for example within the steering column.

PATENTED DEC 14 1971 3,627,345

ENERGY ABSORPTION DEVICES FOR VEHICLES

The present invention relates to a device for absorbing energy in automotive vehicles, and is applicable more particularly to a vehicle seat, notably of the type hingedly attached to the floor of the vehicle and associated with at least one energy absorbing and dissipating device.

Safety seats associated with an energy absorption device without subsequent restoration of the absorbed energy are already known through the French Pat. No. P.V. 143,652 of Mar. 14, 1968. Energy absorption devices are also used for damping out and limiting the consequences of a shock following the throwing of a passenger in the forward direction in case of front crash of the vehicle. A particularly interesting application of these devices is the multisection steering column, the shaft thereof being adapted to collapse in case of application of a sudden and fierce shock to the front of the vehicle, which causes the driver to be thrown against the steering wheel. The French Pat. No. 144,499 of Mar. 3, 1968 recites a safety steering column of which the steering wheel is adapted to move axially in relation to the passengers' compartment when a shock of predetermined magnitude is applied to said wheel. To avoid the inconveniences due to accidental shocks between the passengers or driver and inner portions of the compartment, it is now current practice to use safety harnesses or belts the anchor points of which are disposed mainly on the floor or the door sills. However, devices for securing such safety belts or harnesses to body or chassis elements are not suitable for seats associated with energy absorption devices and adapted to tilt forwards. In this case the safety harnesses are anchored to means carried by the seat frame or structure so that the driver or passenger becomes an integral part of his seat.

It is known that a now current safety requirement is not only to minimize the injuries likely to be caused by steering control members to the driver in case of a shock or crash, but also to limit the force exerted on the driver's chest to a maximum value beyond which the steering wheel must collapse in front of the driver. In most instances the steering column will retard the translation of the driver not rigid with his seat, by absorbing its kinetic energy without restoring same. However, if the driver is attached to a seat associated with an energy absorption device, the impact produced between the driver and the steering wheel will not be sufficient to cause an efficient collapse of the wheel. In this case the steering wheel will cause severe injuries to the driver for the lower effort does not permit the operation of the steering wheel collapsing device.

It is the essential object of the present invention to avoid the inconveniences set forth hereinabove by providing a device permitting on the one hand the collapse or retraction of the steering wheel without any appreciable retaining effort if, when the crash or shock takes place, the driver attached to his seat is tilted forwards, and on the other hand the collapse or retraction of the steering wheel with concomitant energy absorption and dissipation, without any subsequent restoration of the absorbed or dissipated energy, if, in case of sudden and strong shock at the front, the driver not attached to his seat is thrown forwards.

This energy absorption device comprising a fixed element and a movable element both connected to a frame element and to the seat equipped with anchor means for safety harnesses or belts, said seat being adapted to pivot about an axis rigid with the vehicle floor against the resistant effort of said energy absorption device, is characterized by the provision of a member rigid with the movable element of the energy absorption device associated with the seat of the vehicle, said member cooperating unilaterally with a second energy absorption device.

With the device briefly described hereinabove the steering column can collapse in front of the driver attached to his seat, without any possibility of retaining effort, the kinetic energy being absorbed by the seat alone.

Other features and advantages of this invention will appear as the following description proceeds in connection with typical forms of embodiment given by way of example and illustrated diagrammatically in the attached drawing, In the drawing.

Figure 1:
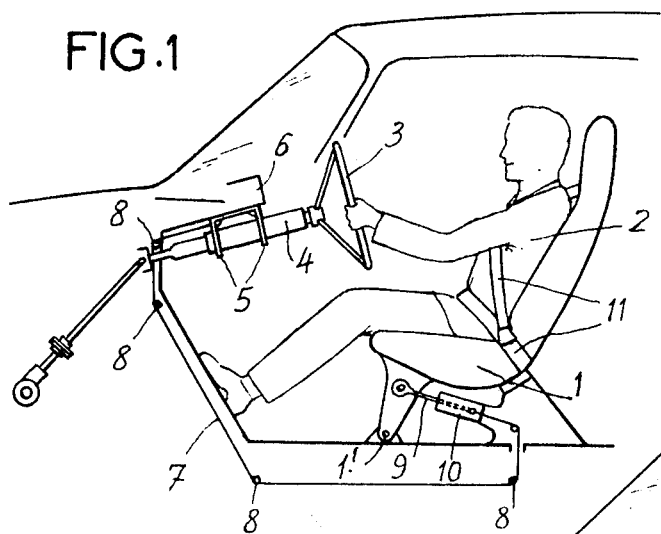
FIG. 1 is a side elevational view showing a driver attached to a seat equipped with the safety device of this invention.
Figure 2:
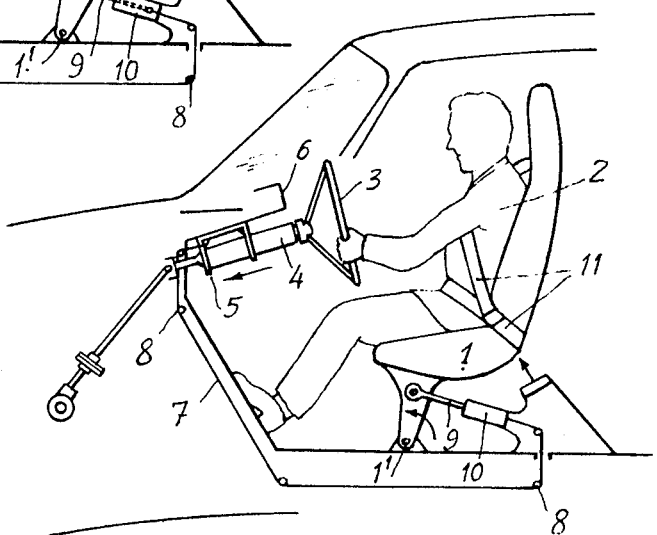
FIG. 2 is a similar view showing the mode of operation of the device when the driver is attached to his seat.

In the exemplary form of embodiment illustrated in FIGS. 1 and 2, a steering wheel 3 or any other protection member disposed within the passengers' compartment and adapted to retain a passenger is disposed in front of the seat 1 of passenger 2. This seat 1 is adapted to pivot about a horizontal transverse axis $1_1$ rigid with the floor of the vehicle. A tubular casing 4 is welded to a bracket 5 secured to the instrument panel 6 of the vehicle by means of plastic shoes (not shown). The tubular casing 4 is riveted as described and illustrated in the French Pat. No. P.V. 144,499 of Mar. 3, 1968, to an inner tubular shaft, so that in case of front shock or crash the effort produced be sufficient for shearing the rivets from the onset, without any risk of injuring the driver. A cable 7 attached to said bracket 5 is passed under tension over guide rollers or pins 8 rigid with the frame structure of the vehicle, and is operatively connected to the movable member 9 of an energy absorption device 10 rigid with the seat 1.

Figure 3:
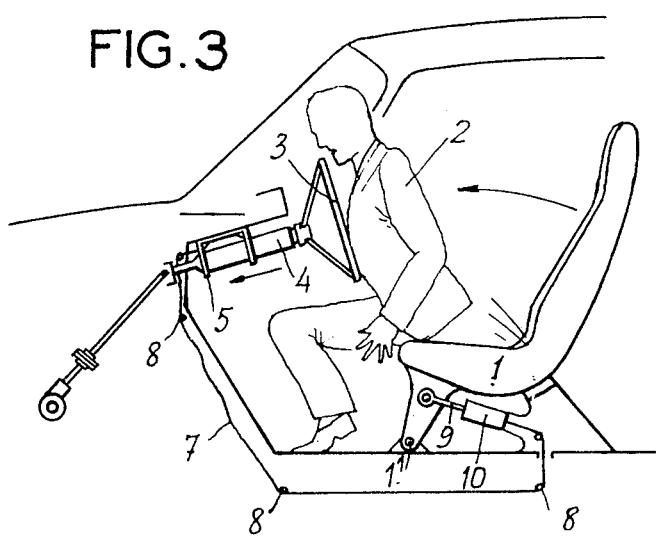
FIG. 3 is another view showing the mode of operation of the device when the driver is not attached to his seat.

In the form of embodiment of FIGS. 1 and 2 as the driver 2 utilizes the safety harness equipping the seat 11, the steering wheel 3 is adapted to collapse when the seat is tilted forwards by operating its inherent energy absorption device 10. In this case the kinetic energy is absorbed by the two devices connected in series, namely the device 10 and the device equipping the steering column. FIG. 2 illustrates the collapse of the steering wheel as a consequence of a shock. In the alternate case illustrated in FIG. 3 the driver is not attached to his seat and when a shock or crash takes place his chest strikes the steering wheel and only the energy absorption device associated with this wheel is operative.

It would not constitute a departure from this invention to replace the mechanical device constituted by the cable 7 with a single-acting cylinder and piston unit of which the piston rod associated with the seat controls another single-acting device of same type associated with the steering column.

The essential feature characterizing this device is its extremely simple design, for it is adaptable to any known energy absorption device associated with the steering system. Under these conditions, the safety seats will require energy absorption devices of relatively reduced overall dimensions since one fraction of the kinetic energy developed during a shock or crash is absorbed by the collapse of the steering wheel.

Of course, various modifications and variations may be brought to the specific forms of embodiment of this present invention which are shown and described herein, without departing from the scope of the invention as defined in the appended claims.

I claim:

1. An energy absorption device for use in automobiles having a chassis, a seat equipped with anchor means for safety harnesses and pivotally mounted on said chassis about an axis transverse to said chassis, and a steering column, said device comprising a first energy absorption means mounted between said chassis and said seat to oppose pivotal motion of said seat, a second energy absorption means forming a collapsible portion of said steering column, and means interconnecting said first and said second energy absorption means and adapted to actuate said second means unilaterally in response to actuation of said first means.

2. An energy absorption device according to claim 1, wherein said means interconnecting said first and said second energy absorption means comprises cable means connected to movable portions of said first and second energy absorption means.

* * * * *